US012640429B2

(12) United States Patent
Mille

(10) Patent No.: US 12,640,429 B2
(45) Date of Patent: May 26, 2026

(54) ELECTRICAL ENERGY STORE FOR A MOTOR VEHICLE, MOTOR VEHICLE, AND METHOD FOR THE PRODUCTION THEREOF

(71) Applicant: Bayerische Motoren Werke Aktiengesellschaft, Munich (DE)

(72) Inventor: Christophe Mille, Villard de Lans (FR)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 758 days.

(21) Appl. No.: 17/913,864

(22) PCT Filed: Mar. 22, 2021

(86) PCT No.: PCT/EP2021/057239
§ 371 (c)(1),
(2) Date: Sep. 23, 2022

(87) PCT Pub. No.: WO2021/213748
PCT Pub. Date: Oct. 28, 2021

(65) Prior Publication Data
US 2023/0115568 A1 Apr. 13, 2023

(30) Foreign Application Priority Data
Apr. 21, 2020 (DE) ..................... 10 2020 110 813.3

(51) Int. Cl.
*H01M 50/249* (2021.01)
*H01M 50/204* (2021.01)
(Continued)

(52) U.S. Cl.
CPC ....... *H01M 50/249* (2021.01); *H01M 50/204* (2021.01); *H01M 50/258* (2021.01);
(Continued)

(58) Field of Classification Search
CPC ............ H01M 50/249; H01M 50/204; H01M 50/258; H01M 50/503; H01M 50/516; H01M 2220/20; Y02E 60/10
See application file for complete search history.

(56) References Cited

U.S. PATENT DOCUMENTS

2008/0241667 A1 10/2008 Kohn et al.
2014/0322581 A1 10/2014 Rueter et al.
(Continued)

FOREIGN PATENT DOCUMENTS

CN 105814713 A 7/2016
CN 110313084 A 10/2019
(Continued)

OTHER PUBLICATIONS

Machine translation of DE102014106414A1 (cited on IDS) (Year: 2015).*
(Continued)

*Primary Examiner* — Eugenia Wang
(74) *Attorney, Agent, or Firm* — Crowell & Moring LLP

(57) ABSTRACT

An electrical energy store for a motor vehicle includes storage cells, a retaining element which is supported on the storage cells and by way of which the storage cells are fixed relative to one another, and a current collecting element common to the storage cells and held on the retaining element, to which current collecting element a terminal of each storage cell is electrically connected. The terminal of each storage cell is electrically connected to the current collecting element via a connection element, which is pre-mounted on the retaining element at a mounting point independently of the current collecting element and independently of the storage cells.

11 Claims, 3 Drawing Sheets

(51) Int. Cl.
| | |
|---|---|
| *H01M 50/258* | (2021.01) |
| *H01M 50/503* | (2021.01) |
| *H01M 50/516* | (2021.01) |

(52) U.S. Cl.
CPC ....... *H01M 50/503* (2021.01); *H01M 50/516* (2021.01); *H01M 2220/20* (2013.01)

(56) References Cited

U.S. PATENT DOCUMENTS

| | | |
|---|---|---|
| 2016/0322673 A1 | 11/2016 | Meinstchel et al. |
| 2017/0200930 A1 | 7/2017 | Ruehle et al. |
| 2017/0288199 A1 | 10/2017 | Nakayama et al. |
| 2020/0076028 A1 | 3/2020 | Darbandi et al. |

FOREIGN PATENT DOCUMENTS

| | | |
|---|---|---|
| DE | 10 2013 207 536 A1 | 11/2014 |
| DE | 10 2014 106 414 A1 | 11/2015 |
| DE | 10 2014 213 275 A1 | 1/2016 |
| DE | 11 2015 004 018 T5 | 5/2017 |
| DE | 10 2017 004 939 A1 | 7/2018 |
| DE | 10 2017 009 385 A1 | 4/2019 |
| DE | 10 2017 218 567 A1 | 4/2019 |
| DE | 10 2018 207 327 A1 | 11/2019 |
| EP | 2 608 243 A1 | 6/2013 |
| EP | 3 565 025 A1 | 11/2019 |

OTHER PUBLICATIONS

Chinese-language Office Action issued in Chinese Application No. 202180022236.3 dated Jul. 5, 2023 with English translation (15 pages).
Chinese-language Office Action issued in Chinese Application No. 202180022236.3 dated Jan. 22, 2024 with English translation (10 pages).
International Search Report (PCT/ISA/210) issued in PCT Application No. PCT/EP2021/057239 dated May 26, 2021 with English translation (five (5) pages).
German-language Written Opinion (PCT/ISA/237) issued in PCT Application No. PCT/EP2021/057239 dated May 26, 2021 (three (3) pages).
German-language Search Report issued in German Application No. 10 2020 110 813.3 dated Dec. 1, 2020 with partial English translation (10 pages).

\* cited by examiner

ELECTRICAL ENERGY STORE FOR A MOTOR VEHICLE, MOTOR VEHICLE, AND METHOD FOR THE PRODUCTION THEREOF

BACKGROUND AND SUMMARY OF THE INVENTION

The invention relates to an electrical energy store for a motor vehicle. The invention also relates to a motor vehicle having at least one such energy store. In addition, the invention relates to a method for producing such an electrical energy store.

A cell block for a battery can be inferred as known from DE 10 2013 207 536 A1. US 2008/0241667 A1 discloses a battery pack system for use in an electric vehicle. EP 2 608 243 A1 discloses a fuse board having a metal plate. Furthermore, DE 10 2017 004 939 A1 discloses a method for the electrically conductive connection of the electrical poles of battery cells to one another. In addition, a battery pack can be inferred as known from DE 10 2014 106 414 A1.

It is an object of the present invention to devise an electrical energy store for a motor vehicle, a motor vehicle and a method, so that the electrical energy store can be produced particularly simply.

This object is achieved by an electrical energy store, by a motor vehicle and by a method according to the claimed invention.

A first aspect of the invention relates to an electrical energy store for a motor vehicle. This means that the motor vehicle, preferably designed as an automobile, in particular as a passenger car, comprises the electrical energy store in its completely produced state. The electrical energy store is also designated as an energy store or store, wherein electrical energy or electrical current is stored or can be stored in the energy store or by way of the energy store, in particular galvanically or electrochemically. To this end, the electrical energy store has a plurality of storage cells, also simply designated as cells, in or by way of which the electrical energy is stored or can be stored. In particular, the electrical energy can be stored galvanically or electrochemically by way of the storage cells. The energy store is, for example, a battery, so that the respective storage cell can be a battery cell. In particular, the battery can be a lithium ion battery, so that the respective storage cell is a lithium ion storage cell or lithium ion battery cell.

For example, in its completely produced state, the motor vehicle also has at least one electric machine, by way of which the motor vehicle can be driven electrically, in particular purely electrically. Thus, the electric machine is also designated as a traction machine. In order to drive the motor vehicle electrically by way of the electric machine, in particular purely electrically, the electric machine is operated in a motor mode and thus as an electric motor. To this end, the electric machine is supplied with the electrical energy stored in the energy store. Thus, the energy store is also designated as a traction store, in particular also as a traction battery. Preferably, the energy store and/or the electric machine is a high-voltage component, the electric voltage, in particular electric operating or nominal voltage, of which is preferably at least 48 V. Preferably, the electric voltage, in particular electric operating or nominal voltage, of the respective high-voltage component is greater than 50 V, in particular greater than 60 V and very preferably the electric voltage, in particular electric operating or nominal voltage, of the respective high-voltage component is several hundred volts. In this way, particularly high electrical powers for driving the motor vehicle electrically, in particular purely electrically, can be implemented. The motor vehicle is thus preferably designed as a hybrid vehicle or else as an electric vehicle, in particular as a battery-electric vehicle (BEV). The storage cells are, for example, electrically connected to one another. The storage cells can be prismatic on the outer circumferential side, so that the storage cells can be designed as so-called prismatic storage cells. Furthermore, it is conceivable that the storage cells are each round on the outer circumferential side, in particular circular, so that the storage cells can be designed, for example, as round cells.

The electrical energy store has at least one retaining element, which is formed separately from the storage cells. The retaining element is, for example, formed of a plastic. In particular, the retaining element is dimensionally stable or inherently stiff. The retaining element is supported at least indirectly, in particular directly, on the storage cells. Furthermore, it is conceivable that the retaining element is formed in one piece. By way of the retaining element, the storage cells are fixed relative to one another. In particular, the storage cells are held in pairs at a distance from one another by way of the retaining element. The feature that the storage cells are fixed relative to one another by way of the retaining element is to be understood in particular to mean that relative movements between the storage cells are at least limited, in particular avoided, by way of the retaining element. For example, the retaining element is formed as a retaining shell or as a retaining frame. Once more, in other words, the storage cells are retained on one another or connected to one another, in particular mechanically, by way of the retaining element.

The electrical energy store additionally has a current collecting element formed separately from the storage cells and separately from the retaining element and common to the storage cells, which is preferably formed in one piece. The current collecting element is, for example, a busbar or a power busbar and is, for example, also designated as a collector or busbar. Preferably, provision is made for the current collecting element to be electrically conductive or formed of an electrically conductive material. In particular, the current collecting element can be formed of a metallic material such as, for example, copper or aluminum. Furthermore, it is conceivable that the retaining element is formed as a non-conductor or of an electrically nonconductive material. Within the context of this disclosure, a non-conductor or an electrically nonconductive material is understood to be such a component or such a material of which the electrical conductivity is less than $10^{-8}$ Scm$^{-1}$ or of which the specific resistance is greater than $10^{8}$ Ωcm. The current collecting element is at least indirectly, in particular directly, held on the retaining element. In addition, the current collecting element is electrically connected to, in particular at least or exactly, one respective terminal of the respective storage cell. In other words, the feature that the current collecting element is a current collecting element common to the storage cells is to be understood in particular to mean that the storage cells each have at least or exactly one terminal, also designated as a connection element, which is electrically connected to the current collecting element. Thus, the terminals of the storage cells and, as a result, the storage cells themselves are electrically connected to the current collecting element. The respective terminal of the respective storage cell, also designated as a connection element, is, for example, an electric pole, in particular an electric positive pole or else an electric negative pole of the respective storage cell. The respective storage cell has, for example, the respective terminal electrically connected to the current collecting element and at least or exactly one further terminal. If mention is made below of the terminal, the terminals, the respective terminals or the respective terminal, this is to be understood—if not otherwise specified—to mean the respective first or first-named terminal of the respective storage cell that is electrically connected to the current collecting element. For example, the respective terminal of the respective storage cell forms a first pole of the respective storage cell, for example the respective further terminal being a respective second electric pole of the respective storage cell. The respective first electric pole has a first electric polarity, for example, the respective second electric pole having a respective second electric polarity that is different from the first electric polarity. The first electric polarity is, for example, negative, so that the second electric polarity is, for example, positive. It is thus conceivable that the electric negative poles of the storage cells are electrically connected to the current collecting element.

The respective storage cell can, for example, provide via its terminals the electrical energy stored in the respective storage cell, so that, for example, the aforementioned electric machine can be supplied with the electrical energy stored in the respective storage cell. Furthermore, it is conceivable that the electric machine is operable in a generator mode and thus as a generator. Electrical energy of the motor vehicle can be provided by the generator. The electrical energy provided by the generator can, for example, be fed into the respective storage cell via the respective terminals of the respective storage cell and, as a result, stored in the respective storage cell. It is thus conceivable that the storage cells can provide the electrical energy stored in them via the respective terminals and the current collecting element, so that, for example, the electric machine can be supplied with the electrical energy stored in the storage cells via the current collecting element and the respective terminals of the storage cells that are electrically connected to the current collecting element.

In order then to be able to produce the electrical energy store particularly simply and thus in a time-saving and cost-effective manner, an embodiment of the invention provides for the respective terminal of the respective storage cell to be electrically connected to the current collecting element via a respective connection element that is assigned to the respective terminal, in particular dedicated, and formed separately from the storage cells, separately from the current collecting element and separately from the retaining element. This is in particular to be understood to mean that each terminal of the storage cells that is electrically connected to the current collecting element is provided with at least or exactly one connection element formed separately from the respective storage cell and thus separately from the respective terminal, separately from the current collecting element and separately from the retaining element and which, for example, is on the one hand electrically connected at least indirectly, in particular directly, to the respective terminal and, on the other hand, electrically connected at least indirectly, in particular directly, to the current collecting element. As a result, the respective terminals of the storage cells are connected electrically to the current collecting element via the respective connection elements. Provision is preferably made here for the connection elements to be formed separately from one another.

The respective connection element is pre-mounted here on the retaining element at at least or exactly one respective mounting point independently of the current collecting element and independently of the storage cells, as a result of which the respective connection element is held on the retaining element at the mounting point independently of the current collecting element and independently of the storage cells. As a result, for example within the scope of production of the energy store, it is possible to provide the retaining element in a state in which the connection elements are pre-mounted on the retaining element and held as a result, in particular jointly or simultaneously, independently of the storage cells and independently of the current collecting element. It is in particular conceivable here that the retaining element is provided in the aforementioned state before the respective terminals are electrically connected to the current collecting element via the connection elements, before the storage cells are supported on the retaining element and fixed relative to one another by way of the retaining element, and before the current collecting element is fixed to the retaining element. Thus, in the aforementioned state, provision is preferably made for the storage cells to be detached or spaced apart from the retaining element, that is to say not yet supported on the retaining element and not yet fixed relative to one another by way of the retaining element, and that also the current collecting element is still spaced apart and detached from the retaining element and thus not yet fixed to the retaining element. The fact that the respective connection element, for example formed as a lug, is pre-mounted on the retaining element, means firstly that the respective terminal of the respective storage cell can be electrically and, for example, also mechanically connected in a particularly simple way to the connection element pre-mounted on the retaining element. Secondly, the current collecting element can also be electrically and preferably also mechanically connected in a particularly simple way to the respective connection element pre-mounted on the retaining element, so that the energy store as a whole can be produced particularly simply and thus in a time-saving and cost-effective manner.

The invention is based in particular on the following findings: in principle, it is possible to connect the respective terminals of the storage cells electrically to the current collecting element by wire bonding. However, wire bonding is a very slow process, which cannot be carried out automatically or only with a great deal of effort. In order to connect the terminals, in particular automatically, to the current collecting element by wire bonding, it may be necessary to detect by way of optical detection a suitable point at which a so-called bonding wire, via which the respective terminal of the respective storage cell is connected electrically to the current collecting element, can be connected electrically and preferably also mechanically to the respective terminal and to the current collecting element, in particular by welding. To this end, use is made, for example, of an optical detection element, in particular a camera, in order to determine such a suitable point by way of the optical detection element. After such a suitable point has been determined, the bonding wire is, for example, firstly connected electrically and also mechanically to the respective terminal or to the current collecting element by welding. The bonding wire is then unwound from a coil, so that the bonding wire is arranged, for example, on the current collecting element or on the terminal. The bonding wire is then cut and separated from the rest of the coil and finally connected appropriately electrically and also mechanically to the current collecting element or to the connection element, in particular by welding. Since the storage cells are fixed relative to one another by way of the retaining element and preferably also aligned relative to one another, the respective storage cell is aligned relative to the retaining element, in particular when the respective storage cell is at least indirectly, in particular directly, supported on the retaining element. This is done, for example, in a form-fitting manner, in that the respective storage cell is arranged at least partly in a corresponding receptacle of the retaining element. Since the connection element, for example formed as a lug, is already pre-mounted on the retaining element, the respective storage cell and in particular its respective terminal is also aligned relative to the pre-mounted connection element, so that the connection element can then be connected electrically and preferably also mechanically to the respective terminal in a particularly simple way, in particular by welding. Complicated determination and detection of a suitable point at which the connection element could be electrically connected to the respective terminal can be avoided. In particular, the retaining element is itself aligned particularly precisely relative to the respective storage cell or vice versa, so that advantageous and precise alignment of the respective storage cell and thus of the respective terminal relative to the pre-mounted connection element can be implemented. In particular, the detection and analysis of images and the determination of suitable connecting points can be avoided, so that the energy store according to an embodiment of the invention can be produced in a particularly time-saving and cost-effective manner. Since, in addition, the connection element is pre-mounted, that is to say held on the retaining element, the connection element is then already located in an advantageous position when the respective storage cell is supported on the retaining element. Elaborate, time-consuming and costly alignment steps can be avoided. It is also possible to avoid a bonding wire being supplied to a bonding machine and unwound from a coil. In addition, the above-described cutting of a bonding wire, which may be a potential source of particles and quality problems, can be avoided.

Preferably, the respective connection element is dimensionally stable or inherently stiff. The connection element is preferably electrically conductive or formed of an electrically conductive material. In particular, the connection element can be formed of copper or of aluminum.

In an advantageous embodiment of the invention, the respective connection element, preferably formed in one piece, is held in a form-fitting manner on the retaining element at the respective mounting point independently of the storage cells and independently of the current collecting element and, as a result, is pre-mounted on the retaining element in a form-fitting manner at the mounting point independently of the current collecting element and independently of the storage cells. As a result, it can be ensured that the respective connection element is particularly firmly and securely pre-mounted and held on the retaining element. In addition, an advantageous alignment of the respective connection element relative to the retaining element can be ensured thereby. As a result, when the storage cells are supported at least indirectly, in particular directly, on the retaining element, the connection elements are located in advantageous alignments, in order then to be able to connect the connection elements particularly simply and thus in a time-saving and cost-effective manner at least electrically and preferably also mechanically to the respective terminals of the respective storage cells.

A further embodiment is distinguished by the fact that, at the respective mounting point, the retaining element has a cutout, for example formed as a slot and/or through opening, into which the respective connection element is inserted, such that the respective connection element is held on the retaining element in a form-fitting manner at the mounting point independently of the storage cells and independently of the current collecting element and, as a result, is pre-mounted on the retaining element in a form-fitting manner at the mounting point independently of the current collecting element and independently of the storage cells. In this way, particularly simple production of the electrical energy store can be implemented. For example, the slot or the through opening is penetrated completely by the connection element, so that, for example, the connection element projects out of the through opening or out of the slot on both sides or at both ends of the through opening or of the slot. In other words, provision is preferably made for the connection element to project completely through the through opening or the slot. As a result, the respective connection element can be simply pre-mounted and aligned relative to the retaining element.

In a particularly advantageous embodiment of the invention, the respective connection element is electrically and preferably also mechanically connected to the current collecting element on a side of the current collecting element that faces away from the retaining element. As a result, a simple and secure electrical connection between the respective connection element and the current collecting element can be ensured.

After the retaining element has been provided in the aforementioned state, for example, the current collecting element can be inserted between the retaining element and the respective connection element pre-mounted thereon, in order for example to fix the current collecting element to the retaining element as a result. Then, for example, the respective connection element can be at least electrically and preferably also mechanically connected to the current collecting element on the aforementioned side of the current collecting element, in particular by welding.

In order to be able to produce the electrical energy store particularly simply and thus in a particularly time-saving and cost-effective manner, in a further refinement of the invention provision is made for the respective connection element to be electrically and preferably also mechanically connected to the current collecting element by welding, in particular by energy-beam welding and very particularly by laser welding or else by ultrasonic welding.

It has been shown to be further particularly advantageous if the respective connection element is electrically and preferably also mechanically connected to the respective terminal by welding, in particular by energy-beam welding and very particularly by laser welding or else by ultrasonic welding. As a result, the electrical energy store can be produced in a particularly time-saving and cost-effective manner.

In a further, particularly advantageous refinement of the invention, provision is made for the respective storage cell to be at least partly received in a respective receptacle of the retaining element. As a result, the respective storage cell interacts with the retaining element in a form-fitting manner, as a result of which the respective storage cell is aligned particularly simply and particularly precisely relative to the retaining element. In this way, the respective storage cell can be aligned in a particularly simple way particularly precisely relative to the respective connection element pre-mounted on the retaining element, so that the respective terminal can be electrically connected to the respective connection element in a particularly simple way.

It has been shown to be particularly advantageous here if at least one wall area of the respective connection element projects into the respective receptacle, so that the respective terminal is electrically connected to the wall area in the receptacle and as a result electrically connected to the respective connection element. As a result, the respective terminal can be electrically connected particularly simply to the respective connection element, so that the energy store can be produced particularly simply.

Furthermore, it is possible that the respective connection element or at least one of the connection elements is formed as a fuse, by way of which, for example in the event of an excessively high current flowing through the connection element or in the event of a short circuit, the respective storage cell can be disconnected deliberately from the current collecting element, in particular in such a way that the fuse blows or melts.

A second aspect of the invention relates to a motor vehicle preferably formed as an automobile, in particular as a passenger car, which has at least or exactly one electrical energy store according to the first aspect of the invention. Advantages and advantageous refinements of the first aspect of the invention are to be viewed as advantages and advantageous refinements of the second aspect of the invention and vice versa.

A third aspect of the invention relates to a method for producing an electrical energy store for a motor vehicle. In particular, within the context of the method according to the invention, an electrical energy store according to the first aspect of the invention is produced. Advantages and advantageous refinements of the first aspect and of the second aspect of the invention are to be viewed as advantages and advantageous refinements of the third aspect of the invention and vice versa.

In a first step of the method, also designated by a), a plurality of storage cells of the energy store, designed to store electrical energy, are provided. In a second step of the method, also designated by b), a retaining element formed separately from the storage cells is provided. In a third step of the method, also designated by c), the storage cells are at least indirectly, in particular directly, supported on the retaining element formed separately from the storage cells, wherein the storage cells are fixed relative to one another by way of the retaining element. In a fourth step of the method, also designated by d), at least one current collecting element formed separately from the storage cells and separately from the retaining element and common to the storage cells is fixed to the retaining element. In a fifth step of the method, also designated by e), the current collecting element is electrically connected to a respective terminal of the respective storage cell via a respective, in particular one-piece, connection element assigned to the respective terminal, in particular dedicated, and formed separately from the storage cells, separately from the current collecting element and separately from the retaining element. If not otherwise specified, the steps of the method can be carried out in any desired order.

In order to be able to produce the energy store particularly simply and thus in a time-saving and cost-effective manner, provision is made that, in the second step, i.e. in step b), and preferably before the third step, i.e. before step c), and/or preferably before the fourth step and thus before step d), and/or preferably before the fifth step and thus before step e), the retaining element is provided in a state in which the respective connection element is pre-mounted on the retaining element at at least one respective mounting point independently of the current collecting element and independently of the storage cells and, as a result, is held on the retaining element at the mounting point independently of the current collecting element and independently of the storage cells. This means that the second step (b)) is preferably carried out before the third step (c)), before the fourth step (d)) and before the fifth step (e)), the retaining element being provided in the state described in the second step (b)). Once more expressed in other words, provision is preferably made for the connection elements preferably formed separately from one another to be pre-mounted on the retaining element, in particular simultaneously, and as a result held on the retaining element, before the storage cells are supported at least indirectly on the retaining element and are fixed relative to one another by way of the retaining element, and before the respective terminals of the respective storage cells are electrically connected to the current collecting element via the connection elements, and preferably also before the current collecting element is electrically connected to the connection elements, and preferably also before the current collecting element is fixed to the retaining element. In this way, the previously described time-consuming and costly process of wire bonding can be avoided, so that the energy store can be produced in a time-saving and cost-effective manner.

Further details of the invention emerge from the following description of an exemplary embodiment with the associated drawings.

DETAILED DESCRIPTION OF THE DRAWINGS

In the figures, identical or functionally identical elements are provided with the same designations.

Figure 1:
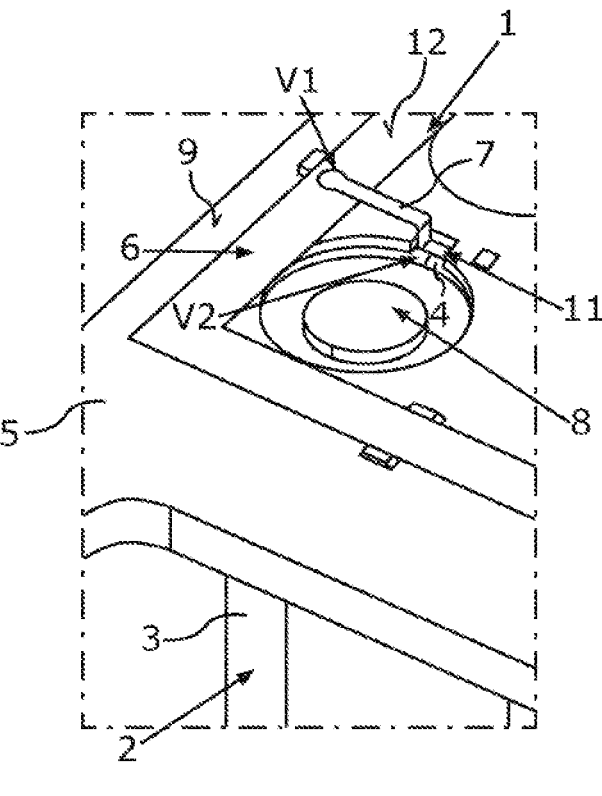
FIG. 1 shows, in detail, a schematic perspective view of an electrical energy store according to an embodiment of the invention for a motor vehicle.

FIG. 1 shows, in a detail in a schematic perspective view, an electrical energy store 1 for a motor vehicle, which is preferably designed as an automobile, in particular as a passenger car. The energy store 1 has a plurality of storage cells in or by way of which electrical energy or electrical current is stored or can be stored. Of the plurality of storage cells, a storage cell designated by 2 can be seen in FIG. 1, wherein the previous and following explanations relating to the storage cell 2 can also be readily transferred to the other storage cells and vice versa. It can be seen from FIG. 1 that the storage cell 2 in the present case is designed as a round cell. This means that the outer circumference of the storage cell 2 is round, in particular circular. This is to be understood in particular to mean that the storage cell 2 has a cell housing 3 of which the outer circumference is round, in particular circular. The storage cell 2 has a connection 4, also designated as a terminal or connection element, which, for example, forms an electrical negative pole of the storage cell 2. Via the terminal 4, the storage cell 2 can provide the electrical energy stored therein. Thus, for example via the terminal 4, an electric machine of the motor vehicle can be supplied with the electrical energy stored in the storage cell 2. As a result, the electric machine can be operated in a motor mode and thus as an electric motor, by way of which the motor vehicle can be driven electrically, in particular purely electrically.

The energy store 1 additionally has a retaining element 5, formed for example as a retaining frame or retaining shell, which is preferably formed in one piece. Alternatively or additionally, the retaining element 5 is formed of a plastic. In particular, the retaining element 5 is formed of an electrical, non-conducting material and thus as a non-conductor. The retaining element 5 is supported at least indirectly, in particular directly, on the storage cells 2, as a result of which the storage cells 2 are fixed to one another or relative to one another by way of the retaining element 5. The energy store 1 additionally has a current collecting element 6 which is formed separately from the storage cells 2 and separately from the retaining element 5 and is common to the storage cells 2, which is also designated as a collector. For example, the current collecting element 6 is formed as a current busbar also simply designated as a collector or busbar. Preferably, the current collecting element 6 is formed of an electrically conductive material such as, for example, copper or else aluminum. The current collecting element 6 formed separately from the retaining element 5 and separately from the storage cells 2 is at least indirectly, in particular directly, held on or fixed to the retaining element 5. As will be explained in more detail below, the respective terminals 4 of the storage cell 2 are electrically connected to the current collecting element 6. As a result, the storage cells 2 can provide the electrical energy stored therein via their terminals 4 and via the current collecting element 6, so that the electric machine can be supplied via the current collecting element 6 with the electrical energy stored in the storage cells 2.

The respective terminals 4 of the storage cells 2 electrically connected to the current collecting element 6 are each assigned at least or preferably exactly one connection element 7, via which the respective terminal 4 that is assigned the respective connection element 7 is electrically connected to the current collecting element 6. The connection elements 7 are formed here separately from one another. In addition, the respective connection element 7 is formed separately from the storage cells 2, separately from the retaining element 5 and separately from the current collecting element 6. Preferably, the respective connection element 7 is formed in one piece. The respective connection element 7 is preferably formed of an electrically conductive material, in particular of copper or aluminum. The respective connection element 7 is on the one hand electrically connected to the respective terminal 4 to which the respective connection element 7 is assigned. On the other hand, the respective connection element 7 is electrically connected to the current collecting element 6. Thus, the respective connection element 7 is in electrical contact with the respectively associated terminal 4 and with the current collecting element 6, so that the respective connection element 7 is also designated as a contact element.

It can be seen particularly well from FIG. 1 that in the exemplary embodiment illustrated in the figures, the terminal 4 is formed by a shoulder of the respective storage cell 2, cylindrical in the present case. The respective storage cell 2 has, for example, a respective further terminal 8 which, for example in the present case, forms a respective electrical positive pole of the respective storage cell 2. Preferably, the terminals 4 and 8 are electrically insulated from each other, that is to say isolated galvanically from each other.

Figure 2:
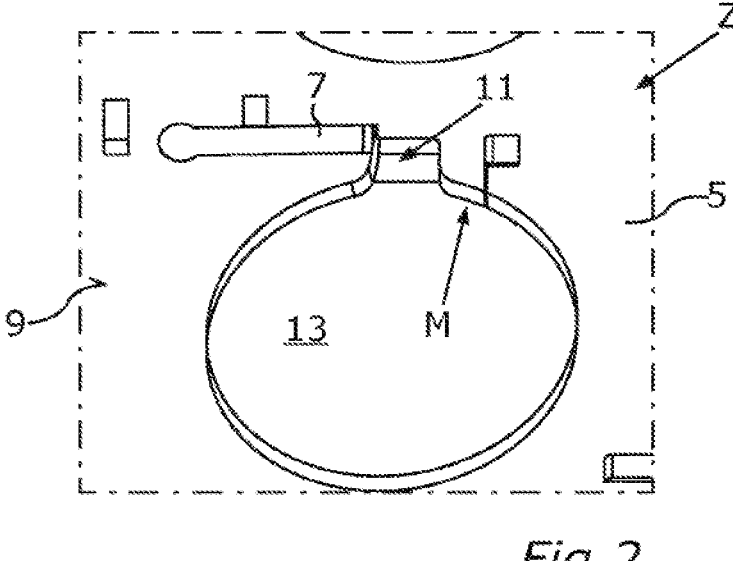
FIG. 2 shows, in detail, a schematic and perspective top view of a retaining element and a connection element of the energy store pre-mounted on the retaining element.
Figure 3:
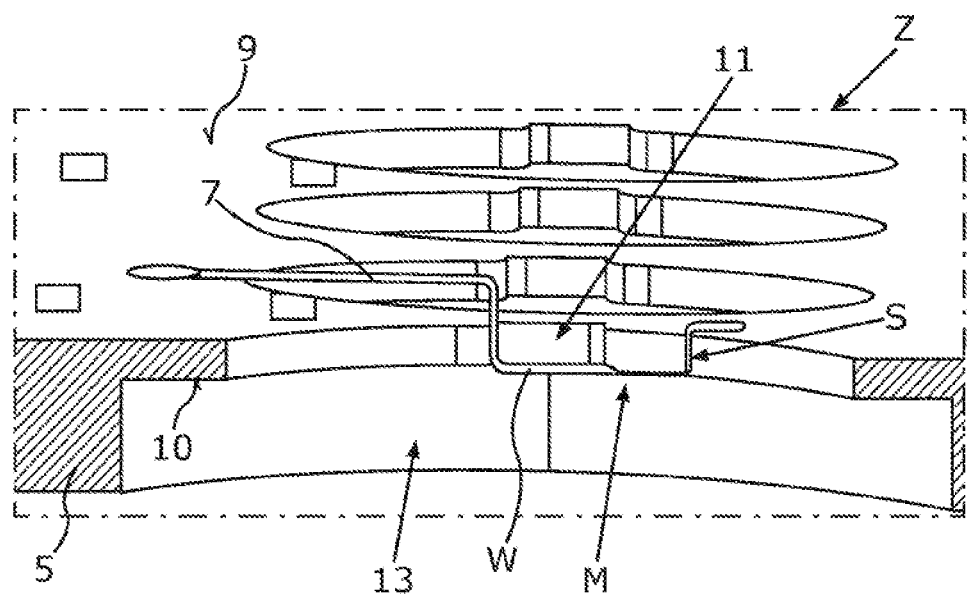
FIG. 3 shows, in detail, a schematic and perspective sectional view of the retaining element according to FIG. 2.

Furthermore, provision is made for the connection elements 7 to be pre-mounted on the retaining element at a respective mounting point independently of the current collecting element 6 and independently of the storage cells 2 and, as a result, held on the retaining element 5 at the respective mounting point independently of the current collecting element 6 and independently of the storage cells 2. This mounting point can be seen particularly well from FIG. 2 and is designated by M there. FIGS. 2 and 3 show the retaining element 5 in a state Z, in which the retaining element 5 is provided during a method for producing the energy store 1. It can be seen from FIGS. 2 and 3 that, in the state Z, the respective connection element 7 is pre-mounted on the retaining element 5 independently of the storage cells 2 and independently of the current collecting element 6 and is held as a result, in that the respective connection element 7 is pre-mounted on the retaining element 5 at the respective mounting point M independently of the storage cells 2 and independently of the current collecting element 6 and is held as a result. In the state Z, the storage cells 2 are not yet supported on the retaining element 5 and not yet fixed relative to one another by way of the retaining element 5 and, in the state Z, the current collecting element 6 is not yet electrically connected to the terminals 4 and also not electrically connected to the connection element 7 and, in the state Z, the current collecting element 6 is not yet fixed to the retaining element 5.

Figure 4:
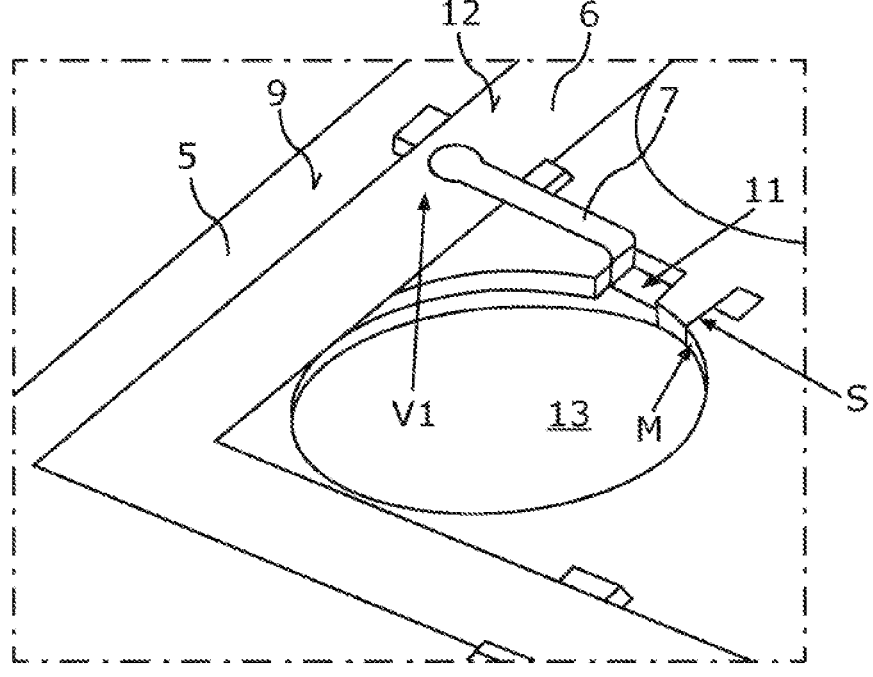
FIG. 4 shows, in detail, a further schematic and perspective top view of the retaining element to which a current collecting element of the energy store is also fixed.
Figure 5:
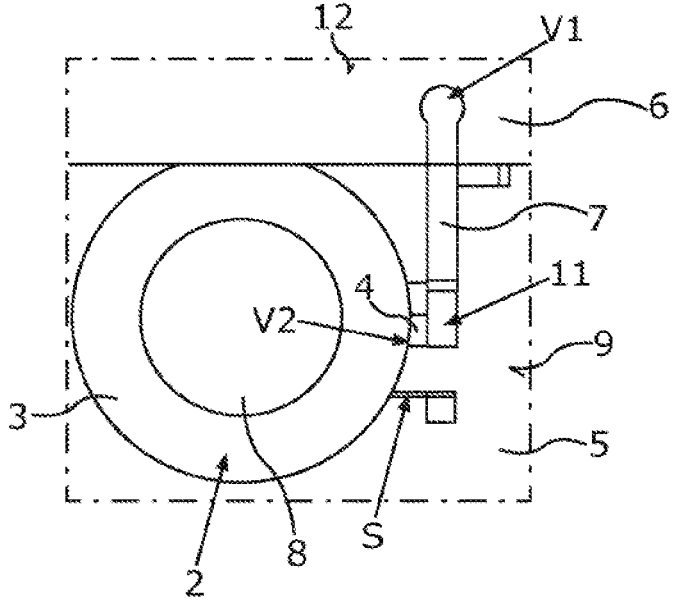
FIG. 5 shows, in detail, a schematic top view of the energy store.

It can be seen from FIGS. 4 and 5 that, in the method, the following can be provided: after the retaining element 5 has been provided in the state Z, for example the current collecting element 6 is fixed to the retaining element 5 and at least electrically and preferably also mechanically connected to the respective connection element 7. Then, the storage cells 2 are supported at least indirectly, in particular directly, on the retaining element 5 and fixed relative to one another by way of the retaining element 5, and the respective terminal 4 is at least electrically and preferably also mechanically connected to the respective, associated connection element 7.

It can be seen particularly well from FIG. 3 that the respective connection element 7 is pre-mounted on the retaining element 5 in a form-fitting manner at the respective mounting point M and is held as a result. To this end, at the respective mounting point M, the retaining element 5 has a cutout, formed as a slot S in the present case, into which the respective connection element 7 is inserted. The slot S is a through opening, through which the respective connection element 7 projects. Starting from the current collecting element 6, which is arranged on a side 9 of the retaining element 5 that faces away from the storage cells 2, i.e. points away from the storage cells 2, the respective connection element 7 extends from the side 9 in the direction of a side 10 of the retaining element 5 that faces the storage cells 2 and thus faces away from the side 9, in that the connection element 7, starting from the current collecting element 6 or from the side 9, extends through a through opening 11 of the retaining element 5. The through opening 11 is spaced apart from the slot S here. The connection element 7 extends here through the through opening 11 onto the side 10. Starting from the side 10, the respective connection element 7 extends into the slot S and through the slot S, so that the respective connection element 7 again extends onto the side 9.

The connection element 7 on the side 9 that faces away from the storage cells 2 is at least electrically and preferably also mechanically connected here to the current collecting element 6. In addition, the connection element 7 on a side 12 of the current collecting element 6 that faces away from the retaining element 5 and thus points away from the retaining element 5 is electrically and preferably also mechanically connected to the current collecting element 6. The connection element 7 is electrically and preferably also mechanically connected to the current collecting element 6 at a connecting point V1. At the connecting point V1, the connection element 7 is electrically and preferably also mechanically connected to the current collecting element 6 for example by welding, in particular by electron-beam welding, laser welding or ultrasonic welding, the connecting point V1 being arranged on the side 12.

At a second connecting point V2, which can be seen particularly well from FIG. 1, the connection element 7 is electrically and preferably also mechanically connected to the terminal 4. For example, the connection element 7 is electrically and preferably also mechanically connected to the terminal 4 at the connecting point V2 by welding, in particular by electron-beam welding, laser welding or ultrasonic welding.

The respective storage cell 2 is at least partly accommodated in a respective, associated receptacle 13 of the retaining element 5. A shape on the inner circumferential side of the respective receptacle 13 here is matched to a respective shape on the outer circumferential side of the storage cell 2, in particular of the cell housing 3. Since, in the present case, the outer circumference of the cell housing 3 is circular, in the present case the inner circumference of the receptacle 13 is likewise circular. As a result, the storage cells 2 interact with the retaining element 5 in a form-fitting manner, so that the storage cells 2 are aligned particularly precisely relative to the retaining element 5 and relative to one another. In addition, when they are arranged in the receptacles 13 and are thus at least indirectly, in particular at least directly, supported on the retaining element 5, the storage cells 2 are thereby particularly precisely aligned relative to the connection elements 7, so that the latter can be particularly simply electrically connected to the terminals 4. The through opening 11 is connected here to the receptacle 13 or the through opening 11 opens into the receptacle 13. In addition, the connection element 7 extends through the through opening 11 and here into the receptacle 13, so that the respective connection element 7 in the respective receptacle 13 is electrically and preferably also mechanically connected to the respective terminal 4. It can be seen particularly well here from FIG. 3 that at least a wall area w of the respective connection element 7 is arranged in the respective receptacle 13. The respective terminal 4 is at least electrically and preferably also mechanically connected to the respective wall area W arranged in the respective receptacle 13, whereby the respective terminal 4 is at least electrically and preferably also mechanically connected to the respective connection element 7 in the respective receptacle 13. For example, the terminals 4 are already electrically in contact with the respective connection elements 7 as a result of the fact that the storage cells 2 are moved into the respective receptacles 13. In this way, the terminals 4 come into, in particular direct, supporting contact and thus into electrical contact with the wall areas W and thus with the connection elements 7. Then, the connection elements 7 and the wall areas W can also be connected mechanically to the terminals 4 in a particularly simple way, in particular by welding. As a result, the energy store 1 can be produced in a particularly time-saving and cost-efficient manner.

LIST OF DESIGNATIONS

1 Electrical energy store
2 Storage cell

3 Cell housing
4 Terminal
5 Retaining element
6 Current collecting element
7 Connection element
8 Further terminal
9 Side
10 Side
11 Through opening
12 Side
13 Receptacle
M Mounting point
S Slot
V1 Connecting point
V2 Connecting point
W Wall area
Z State

The invention claimed is:

1. An electrical energy store for a motor vehicle, the electric energy store comprising:
    a plurality of storage cells for storage of electrical energy;
    a retaining element which is formed separately from the plurality of storage cells and is at least indirectly supported on the plurality of storage cells, by way of which the plurality of storage cells are fixed relative to one another; and
    a current collecting element formed separately from the plurality of storage cells and separately from the retaining element, common to the plurality of storage cells and at least indirectly held on the retaining element, to which a respective terminal of a respective storage cell of the plurality of storage cells is electrically connected, wherein:
    the respective terminal of the respective storage cell is electrically connected to the current collecting element via a respective connection element assigned to the respective terminal and formed separately from the plurality of storage cells, separately from the current collecting element and separately from the retaining element and which, at a respective mounting point, is pre-mounted on the retaining element independently of the current collecting element and independently of the plurality of storage cells and, as a result, is held on the retaining element in direct mechanical contact with the retaining element at the respective mounting point independently of the current collecting element and independently of the plurality of storage cells.

2. The electrical energy store according to claim 1, wherein:
    the respective connection element is held on the retaining element in a form-fitting manner at the respective mounting point independently of the plurality of storage cells and independently of the current collecting element and, as a result, is pre-mounted on the retaining element in a form-fitting manner at the respective mounting point independently of the current collecting element and independently of the plurality of storage cells.

3. The electrical energy store according to claim 2, wherein:
    at the respective mounting point, the retaining element has a cutout, into which the respective connection element is inserted, such that the respective connection element is held on the retaining element in a form-fitting manner at the respective mounting point independently of the plurality of storage cells and independently of the current collecting element and, as a result, is pre-mounted on the retaining element in a form-fitting manner at the respective mounting point independently of the current collecting element and independently of the plurality of storage cells.

4. The electrical energy store according to claim 3, wherein:

the respective storage cell is at least partly accommodated in a respective receptacle of the retaining element.

5. The electrical energy store according to claim 4, wherein:

a wall area of the respective connection element projects into the respective receptacle, so that the respective terminal is electrically connected to the wall area in the receptacle and as a result is electrically connected to the respective connection element.

6. A motor vehicle comprising the electrical energy store according to claim 3.

7. The electrical energy store according to claim 1, wherein:

the respective connection element is electrically connected to the current collecting element on a side of the current collecting element that faces away from the retaining element.

8. The electrical energy store according to claim 1, wherein:

the respective connection element is electrically connected to the current collecting element by welding.

9. The electrical energy store according to claim 8, wherein the respective connection element is electrically connected to the current collecting element by laser welding or ultrasonic welding.

10. The electrical energy store according to claim 1, wherein:

the respective connection element is electrically connected to the respective terminal by welding.

11. The electrical energy store according to claim 10, wherein the respective connection element is electrically connected to the respective terminal by laser welding or ultrasonic welding.

* * * * *